(12) United States Patent
Kurita

(10) Patent No.: US 9,653,983 B2
(45) Date of Patent: May 16, 2017

(54) POWER CONVERSION APPARATUS

(75) Inventor: Naoyuki Kurita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 14/406,078

(22) PCT Filed: Aug. 28, 2012

(86) PCT No.: PCT/JP2012/071677
§ 371 (c)(1),
(2), (4) Date: Dec. 5, 2014

(87) PCT Pub. No.: WO2014/033830
PCT Pub. Date: Mar. 6, 2014

(65) Prior Publication Data
US 2015/0123479 A1    May 7, 2015

(51) Int. Cl.
| | |
|---|---|
| *H02J 9/06* | (2006.01) |
| *H01F 3/10* | (2006.01) |
| *H01F 27/25* | (2006.01) |
| *H01F 37/00* | (2006.01) |
| *H02M 1/12* | (2006.01) |

(Continued)

(52) U.S. Cl.
CPC .............. *H02M 1/126* (2013.01); *H01F 3/10* (2013.01); *H01F 27/25* (2013.01); *H01F 37/00* (2013.01); *H02J 3/382* (2013.01); *H02J 9/06* (2013.01); *H02M 5/458* (2013.01); *H02M 7/537* (2013.01); *H02J 3/386* (2013.01); *H02M 5/4585* (2013.01); *Y02E 10/763* (2013.01); *Y10T 307/625* (2015.04)

(58) Field of Classification Search
CPC .... H02M 1/126; H02M 5/458; H02M 5/4585; H02M 7/537; H01F 3/10; H01F 27/25; H01F 37/00; H02J 3/382; H02J 3/386; H02J 9/06; Y10T 307/625; Y02E 10/763

USPC .......................................................... 307/66
See application file for complete search history.

(56) References Cited

U.S. PATENT DOCUMENTS

2014/0268896 A1* 9/2014 Kurita ..................... H01F 37/00
                                                        363/17
2014/0292455 A1* 10/2014 Kurita ....................... H01F 3/14
                                                        336/5

FOREIGN PATENT DOCUMENTS

| EP | 2 711 944 A1 | 3/2014 |
| EP | 2 775 488 A1 | 9/2014 |

(Continued)

OTHER PUBLICATIONS

Extended European Search Report received in corresponding European Application No. 12883839.8 dated Apr. 20, 2016.

*Primary Examiner* — Hal Kaplan
(74) *Attorney, Agent, or Firm* — Mattingly & Malur, PC

(57) ABSTRACT

A power conversion apparatus is applied to a filter circuit. A reactor of the filter circuit includes a vertical pair of yoke iron cores, in each of which a thin strip of magnetic material is rolled in a toroidal manner and magnetic leg iron cores having respective phases being a pillar formed of thin-strip shaped magnetic material, being provided on a symmetrical position on a circumference with respect to a center of the yoke iron cores, connecting the vertical pair of the yoke iron cores, and providing a coil. The reactor also includes magnetic leg iron cores for zero-phase impedance having the respective phases, each having a rectangular parallelepiped shape in which a plurality of thin strips made of magnetic material are laminated in a direction toward a periphery from the center of the yoke iron cores and being provided between the magnetic leg iron cores.

9 Claims, 4 Drawing Sheets

(51) Int. Cl.
 *H02M 7/537* (2006.01)
 *H02M 5/458* (2006.01)
 *H02J 3/38* (2006.01)

(56) References Cited

FOREIGN PATENT DOCUMENTS

| | | |
|---|---|---|
| JP | 59-89526 U | 6/1984 |
| JP | 1-60514 U | 4/1989 |
| JP | 1-115223 U | 8/1989 |
| JP | 2-57686 B2 | 12/1990 |
| JP | 05-234783 A | 9/1993 |
| WO | 2011/158290 A1 | 12/2011 |

\* cited by examiner

POWER CONVERSION APPARATUS

TECHNICAL FIELD

The present invention relates to a power conversion apparatus including a filter circuit.

BACKGROUND ART

In solar power generation apparatus and wind power generation apparatus, power conversion is performed by a power conversion apparatus before DC power or AC power generated by power generation means is supplied to an AC system.

In the power conversion apparatus, a pseudo AC waveform in PWM (Pulse Width Modulation) or the like is generated by an inverter circuit including a switching element such as an IGBT, and is then formed to be a sinusoidal waveform by a filter circuit including an inductor element such as a reactor and a capacitor element such as a capacitor.

In a large-capacity power conversion apparatus, iron cores of a reactor constituting a filter circuit are such that: laminated iron cores, each of which is formed by laminating a plurality of thin plates of magnetic material such as thin plates of silicon steel and amorphous, are used to reduce a loss (iron loss) during operation; and three coils of a U phase coil, a V phase coil, and a W phase coil are wound around three magnetic legs arranged on a plane.

In order to flow a magnetic flux generated in accordance with zero-phase impedance that is generated when a voltage and a current value of each phase and/or a mutual phase-difference in three-phase alternating current deviate from an ideal state, there is commonly used a three-phase five-leg type iron core in which two magnetic legs having no coil wound around are further added on both sides of three magnetic legs.

A structure of this three-phase five-leg type iron core is disclosed in, for example, PTL 1. PTL 1 discloses that a three-phase five-leg iron core is formed such that: four two-legged iron cores, each of which is a laminated iron core formed by laminating a plurality of thin steel plates, are arranged side by side; pairs of adjacent two legs constitute three main legs; and phase coils having respective phases are wound around the three main legs.

CITATION LIST

Patent Literature

PTL 1: JP-A-5-234783

SUMMARY OF INVENTION

Technical Problem

FIG. 7 schematically illustrates a three-phase transformer in which the three-phase five-leg type iron core disclosed in PTL 1 is used. In FIG. 7, four two-legged annular iron cores 31 formed by laminating thin magnetic material are arranged side by side, and three magnetic leg sections 31a, 31b, 31c formed by the respective pairs of adjacent iron cores are wound with coils 30a, 30b, 30c, respectively, thereby constituting three-phase coils. Magnetic leg sections 31d, 31e of the two-legged iron cores, which are positioned at both ends and have no coils wound around, are used as magnetic legs for zero-phase impedance.

Note that, in PTL 1, the above structure is disclosed as a transformer, however, this transformer having an entirely identical iron core shape functions as a reactor device in a case where the coils are formed of only primary winding wires without secondary winding wires.

Because the conventional three-phase five-leg type iron core is structured such that the three-phase coils are linearly arranged on a plane, a width of the transformer or the reactor device becomes large, and therefore, in a case where the conventional three-phase five-leg type iron core is applied to a filter element of a power conversion apparatus, a housing problem is raised. Further, because distances between the three coils are different from one another, symmetry of the phases is easily deviated, and therefore there is a problem in that it is difficult to obtain operational stability and a low loss property.

The invention is proposed to improve the above weak points, and an object of the invention is to provide a high-efficient power conversion apparatus in which a reactor device having an excellent housing property, improved symmetry between three-phase coils, excellent operational stability, and an excellent low loss property is applied to a filter circuit.

Solution to Problem

In order to solve the above problem, for example, a structure recited in CLAIMS is employed. The present application includes multiple kinds of means to solve the above problems, and an example of the means includes an inverter for converting DC power and polyphase AC power with use of a switching element, and a filter circuit including a reactor provided on an AC-terminal side of the inverter, in which the inverter turns on and off the switching element at a timing at which a carrier frequency and a fundamental frequency intersect each other to produce pseudo sine wave alternating current on the AC-terminal side and sine wave alternating current is produced by the filter circuit, in which the reactor of the filter circuit includes a vertical pair of yoke iron cores, in each of which a thin strip of magnetic material is rolled in a toroidal manner, magnetic leg iron cores having respective phases, each of the magnetic leg iron cores being a pillar formed of thin-strip shaped magnetic material, being provided on a corresponding position on a circumference with respect to a center of the yoke iron cores, connecting the vertical pair of the yoke iron cores, and providing a coil, and magnetic leg iron cores for zero-phase impedance having the respective phases, each of the magnetic leg iron cores for zero-phase impedance having a rectangular parallelepiped shape in which a plurality of thin strips made of magnetic material are laminated in a direction toward a periphery from the center of the yoke iron cores, being provided between the magnetic leg iron cores on a corresponding position on the circumference with respect to the center of the yoke iron core, connecting the vertical pair of the yoke iron cores, and providing no coil.

Advantageous Effects of Invention

According to the invention, it is possible to provide a power conversion apparatus having an excellent housing property, improved symmetry of three-phase alternating current, and excellent conversion efficiency, as compared with a case where a conventional three-phase five-leg type iron core is used in a reactor device of a filter circuit.

DESCRIPTION OF EMBODIMENTS

Examples will be described with reference to drawings.
Examples

A power conversion apparatus of the invention includes an inverter for converting DC power and AC power with use of a switching element and a filter circuit including a reactor provided on an AC-terminal side of the inverter. The inverter turns on and off the switching element at a timing at which a carrier frequency and a fundamental frequency intersect each other, thereby producing pseudo sine wave alternating current on the AC-terminal side.

Figure 1:
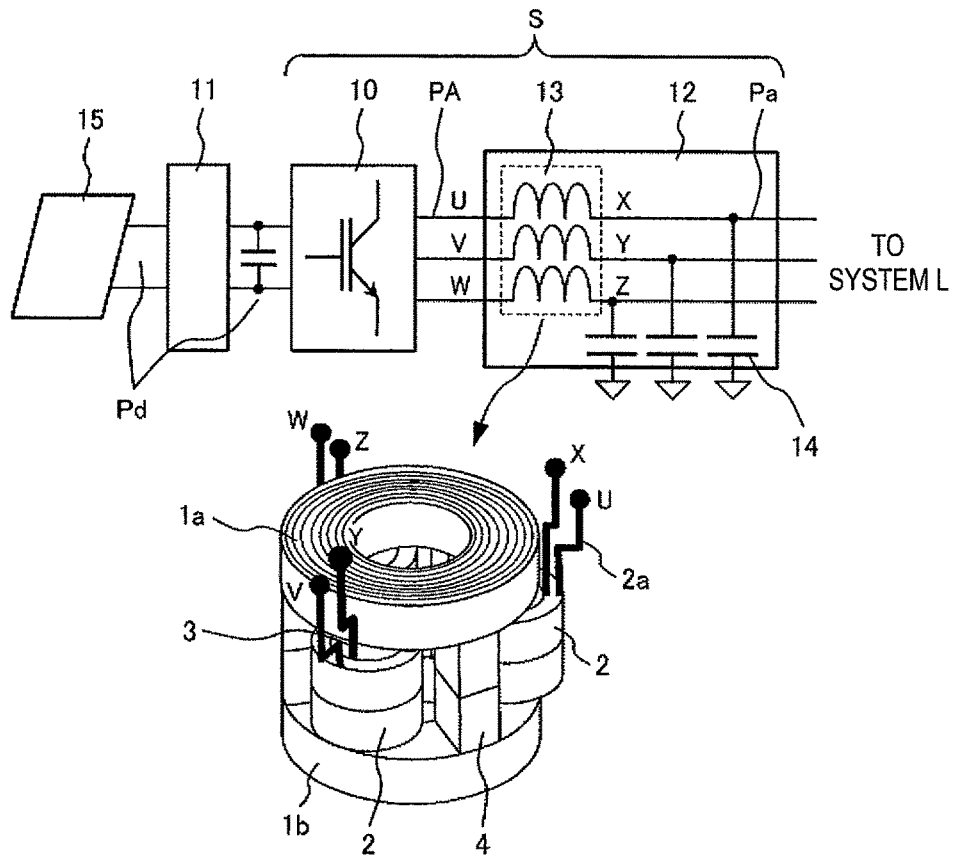
FIG. 1 illustrates a structure of a power conversion apparatus for solar power generation.
Figure 2:
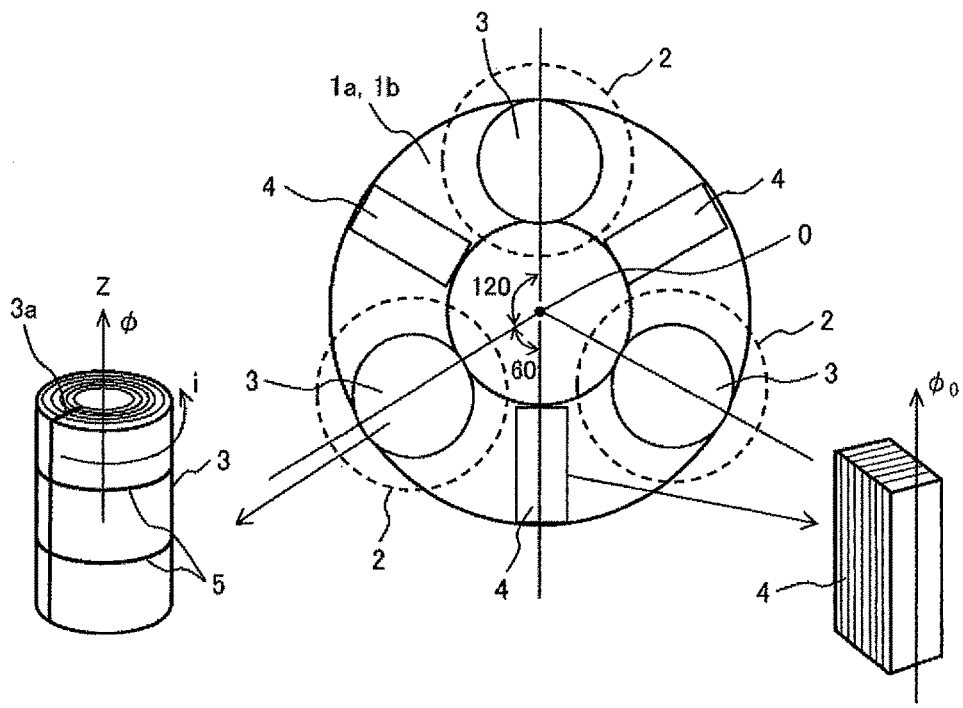
FIG. 2 is a top perspective view of an example of a reactor device.
Figure 3:
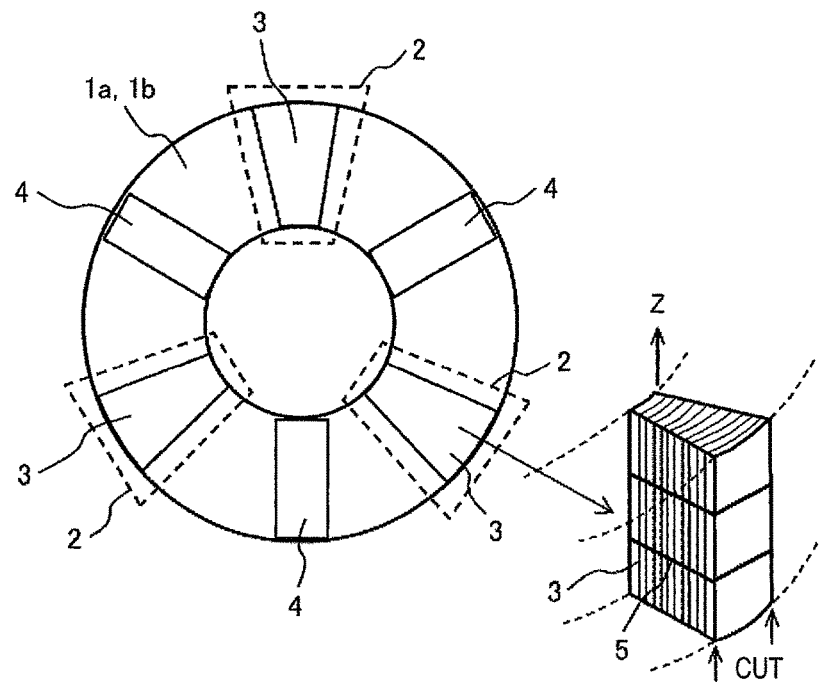
FIG. 3 is a top perspective view of another example of a reactor device.

A structure of the reactor of the power conversion apparatus as premised above is a feature of the invention, and examples of the invention are illustrated in FIG. 1 to FIG. 3. FIG. 1 illustrates a structure of a power conversion apparatus for solar power generation for supplying, to an AC system L, DC power generated by a solar cell 15. The power conversion apparatus of the invention including the inverter for converting DC power and AC power with use of the switching element and the filter circuit including the reactor provided on the AC-terminal side of the inverter corresponds to a portion S of FIG. 1.

Because DC power Pd generated by the solar cell 15 changes depending on an amount of solar radiation, weather, and the like, DC power Pd is first converted to DC power having a fixed voltage by a boost converter 11. Then, ignition timing control such as PWM in a full-bridge inverter 10 including a switching element such as an IGBT generates pseudo three-phase AC power PA.

Although not shown, conversion parameters, such as a transformation ratio and percentage of modulation, of the boost converter 11 and the inverter 10 are constantly regulated by controlling means (not shown) connected to those circuits in accordance with a voltage value generated in the solar cell 15 and are regulated so that pseudo three-phase AC power PA supplied to a filter 12 is substantially fixed.

The filter 12 includes a three-phase reactor 13 connected to three phase wires in series and three capacitors 14 connected to the three phase wires in parallel, and converts the pseudo three-phase AC power PA to sinusoidal three-phase AC power Pa, thereby supplying the sinusoidal three-phase AC power Pa to the AC system L.

In the invention, because pseudo three-phase AC power PA is used, the three-phase reactor device 13 constituting the filter 12 is structured as described below. As a first example of the three-phase reactor device 13, a perspective view thereof is illustrated in FIG. 1 and a top perspective view thereof is illustrated in FIG. 2.

An entire external appearance will be described with reference to the perspective view of FIG. 1. In FIG. 1, the three-phase reactor device 13 includes: doughnut-shaped yoke iron cores 1a, 1b which are vertically arranged; magnetic leg iron cores 3 having respective phases and arranged between the vertical yoke iron cores 1a, 1b at an interval of 120°; coils 2 wound around the respective magnetic leg iron cores having the respective phases; and magnetic leg iron cores 4 for zero-phase impedance, arranged at an interval of 120° between the vertical yoke iron cores 1a, 1b and also between the magnetic leg iron cores 3 having the respective phases. Note that one of winding start wires and winding end wires of the coils 2 having the respective phases are connected as electrodes 2a to phases U, V, W on an inverter-10 side and the other one thereof are connected as the electrodes 2a to phases X, Y, Z on an AC-system-L side.

Arranging the magnetic leg iron cores 4 for zero-phase impedance between the magnetic leg iron cores 3 having the respective phases is a feature of the three-phase reactor device 13 used in the power conversion apparatus of the invention. Each section of the three-phase reactor device 13 will be further described in detail.

As described above, the three-phase reactor device 13 includes three types of iron cores. The yoke iron cores 1a, 1b, the magnetic leg iron cores 3, and the magnetic leg iron cores 4 for zero-phase impedance correspond to the three types. Each of the iron cores is formed with use of a part in which, for example, a plurality of thin strips made of magnetic material such as amorphous are laminated.

Among them, each of the yoke iron cores 1a, 1b, which is a first iron core, is formed by rolling (rolling and laminating) a thin strip made of magnetic material in a toroidal manner while applying insulation. Each of the yoke iron cores 1a, 1b has a doughnut shape, i.e., has a hollow at a center. In the top perspective view of FIG. 2, the center of the yoke iron cores 1a, 1b is denoted by O.

Each of the three magnetic leg iron cores 3, which is a second iron core, has a substantially columnar shape and is formed by rolling (rolling and laminating) a thin strip made of magnetic material while applying insulation. As illustrated in FIG. 2, the three magnetic leg iron cores 3 are arranged on a circumference at an interval of 120° with respect to the center O of the yoke iron cores 1a, 1b and connect the two yoke iron cores 1a, 1b.

As illustrated in a left side of FIG. 2, each of the three magnetic leg iron cores 3 has a gap 5 and a slit 3a. The gap 5 provided in at least one portion of the magnetic leg iron core 3 contributes to prevent change or increase in loss of an inductance value of the reactor device because of magnetic saturation of the iron core. The gap 5 is formed by inserting an insulator having an appropriate thickness into a connection portion between parts constituting the magnetic leg iron core 3.

In a case where current is flowing via the electrode 2a connected to the coil 2, as illustrated in FIG. 2, a magnetic flux φ is generated in a longitudinal direction Z (height direction) of the magnetic leg iron core 3, and, because of the magnetic flux, eddy current i flows in a circumferential direction of the iron core. Therefore, a loss of the reactor device is increased. At least one slit 3a provided in the longitudinal direction Z of the magnetic leg iron core contributes to prevent generation of the eddy current i.

On the contrary, in this example, as illustrated on a right side of FIG. 2, each of the magnetic leg iron cores 4 for zero-phase impedance, which is a third iron core, has a rectangular parallelepiped shape formed by laminating a plurality of thin strips made of magnetic material while applying insulation. A lamination direction in this case is a direction toward a periphery from the center O. As described above, the lamination direction of the thin strips made of magnetic material of the magnetic leg iron cores 4 for zero-phase impedance is the same as the lamination direction of the yoke iron cores 1*a*, 1*b* and is preferably a radial direction. The magnetic leg iron cores 4 for zero-phase impedance are arranged on the circumference by rotating positions of the magnetic leg iron cores 4 for zero-phase impedance by 60° from the positions of the magnetic leg iron cores 3, and, as well as the magnetic leg iron cores 3, connect the yoke iron cores 1*a* and 1*b*.

Arranging the magnetic leg iron cores 4 for zero-phase impedance between the magnetic leg iron cores 3 having the respective phases is the feature of the reactor device 13 of the invention. Hereinafter, meaning of provision of the magnetic leg iron cores 4 for zero-phase impedance will be described.

Three-phase current flowing through the coils 2 wound around the three magnetic leg iron cores 3 is ideally equilibrated. However, in fact, because the three-phase current is pseudo three-phase AC power from the inverter 10, phases of the three-phase current flowing through the coils 2 wound around the three magnetic leg iron cores 3 are deviated from an ideal state. Therefore, in a structure in which the magnetic leg iron cores 4 for zero-phase impedance are not arranged, a magnetic flux caused by zero-phase impedance is flowing through the three magnetic leg iron cores 3 and then alternating current containing a zero-phase current component is leaked to the AC-system side.

In the invention, because the magnetic flux $\phi 0$ caused by the zero-phase impedance is flowing through the magnetic leg iron cores 4 for zero-phase impedance, alternating current leaked to the AC-system side via the reactor does not contain the zero-phase current component. Further, by providing the magnetic leg iron cores 4 for zero-phase impedance, it is possible to reduce a mutual inductance generated by magnetic coupling between adjacent arbital two coils, and it is also possible to reduce deviation of a value of a self-inductance that each coil inherently has from a designed value thereof.

Figure 8:
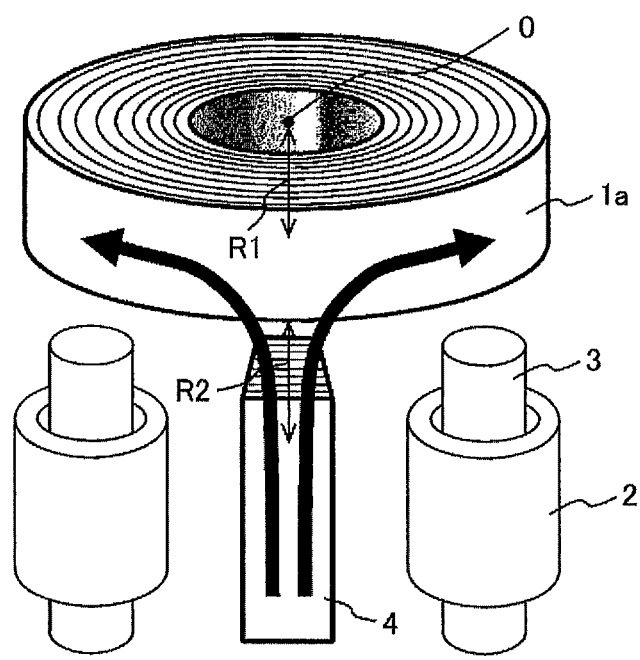
FIG. 8 illustrates lamination directions of yoke iron cores and magnetic leg iron cores for zero-phase impedance.

FIG. 8 illustrates the lamination directions of the yoke iron cores 1*a* and the magnetic leg iron cores 4 for zero-phase impedance. According to FIG. 8, both a lamination direction R1 in which the yoke iron cores 1*a* are rolled and laminated and a lamination direction R2 of the magnetic leg iron cores 4 for zero-phase impedance are a direction toward a periphery from the center O of the yoke iron cores 1*a*, i.e., a radial direction. Therefore, the magnetic flux $\phi 0$ caused by the zero-phase impedance is easily flowing through the magnetic leg iron cores 4 for zero-phase impedance.

In FIG. 8, because the magnetic leg iron cores 4 for zero-phase impedance are arranged between the magnetic leg iron cores 3 having different phases, the magnetic leg iron cores 4 for zero-phase impedance block magnetic coupling between adjacent two coils 2. This reduces mutual inductance.

FIG. 3 is a top perspective view of another example of the three-phase reactor device 13 constituting the filter 12 in this example. FIG. 3 illustrates an example of the reactor device 13 in which each of the three magnetic leg iron cores 3 wound with the coils 2 has a substantially fan shape and is formed by laminating a plurality of thin strips made of magnetic material such as amorphous while applying insulation.

Each of the magnetic leg iron cores 3 is formed by, for example, cutting, at an appropriate angle, in the radial direction, an iron core formed by rolling a thin strip made of magnetic material in a toroidal manner while applying insulation. The at least one or more gaps 5 is provided in the height direction Z in each of the three magnetic leg iron cores 3. Note that the gap 5 is formed by inserting an insulator having an appropriate thickness into the connection portion between the parts constituting the magnetic leg iron core 3. The magnetic leg iron cores 3 and the three magnetic leg iron cores 4 for zero-phase impedance having the same shape as those of FIG. 2 connect the two yoke iron cores 1*a* and 1*b*. Note that the lamination direction of the thin strips made of magnetic material of the magnetic leg iron cores 3 and 4 is the same as the lamination direction of the yoke iron cores 1*a*, 1*b*, and is preferably the radial direction.

Figure 4:
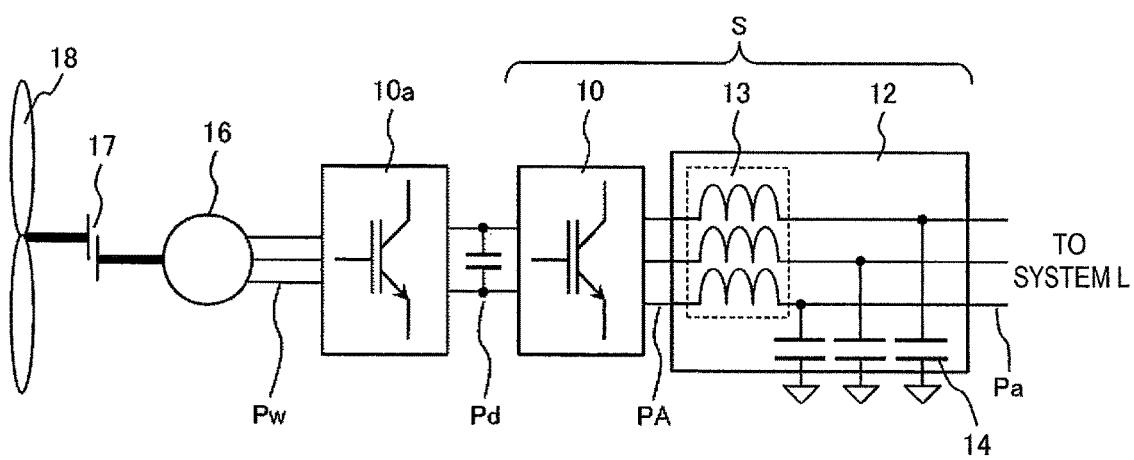
FIG. 4 illustrates a structure of a power conversion apparatus for wind power generation.

FIG. 4 illustrates a structure of a power conversion apparatus for wind power generation for supplying, to the AC system L, AC power generated by a generator connected to a windmill. The power conversion apparatus of the invention including the inverter for converting DC power and AC power with use of the switching element and the filter circuit including the reactor provided on the AC-terminal side of the inverter corresponds to a portion S of FIG. 4.

Because a voltage and a frequency of AC power Pw generated in the generator 16 by rotation of the windmill 18 via the gear 17 change depending on a wind state, AC power Pw is first converted to DC power Pd by a converter 10*a* including a switching element such as an IGBT.

Pseudo three-phase AC power PA in PWM or the like, which has the same fundamental frequency as that of the AC system L, is generated by the full-bridge inverter 10. Although not shown, conversion parameters such as percentage of modulation of the converter 10*a* and the inverter 10 are constantly regulated by controlling means connected to those circuits in accordance with a voltage value and a frequency value generated in the generator 16 and are regulated so that pseudo three-phase AC power supplied to the filter 12 is substantially fixed.

The filter 12 includes the three-phase reactor 13 connected to three phase wires in series and the three capacitors 14 connected to the three phase wires in parallel, and converts the pseudo three-phase AC power PA to three-phase sinusoidal AC power, thereby supplying the three-phase sinusoidal AC power to the AC system L.

The three-phase reactor 13 has iron cores having the same shape as shown in FIG. 1. By using this reactor device, it is possible to achieve a power conversion apparatus having excellent conversion efficiency and having symmetry of outputted three-phase alternating current.

Figure 5:
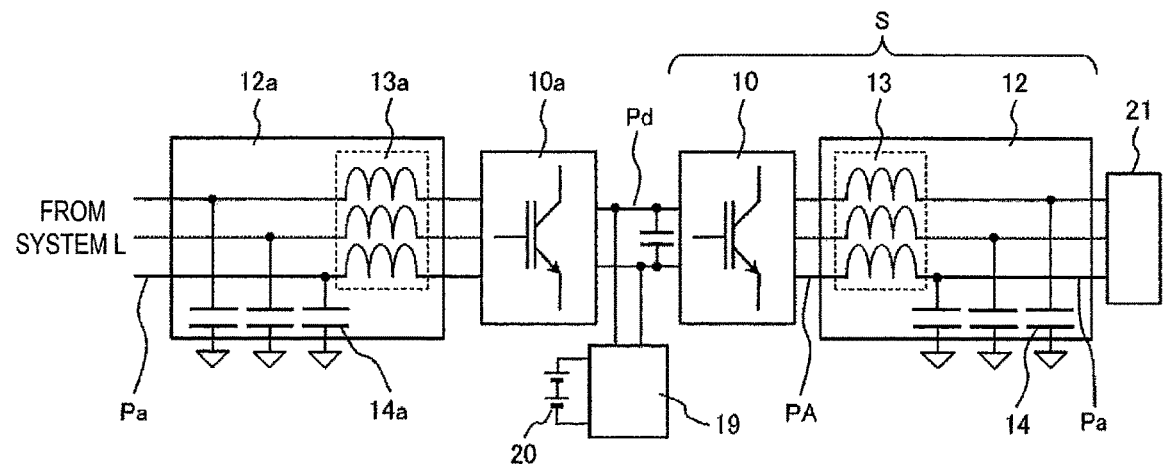
FIG. 5 illustrates a structure of an on-line typed three-phase uninterruptible power supply apparatus.

FIG. 5 illustrates an on-line typed three-phase uninterruptible power supply (UPS) apparatus. The power conversion apparatus of the invention including the inverter for converting DC power and AC power with use of the switching element and the filter circuit including the reactor provided on the AC-terminal side of the inverter corresponds to a portion S of FIG. 5.

The UPS is provided between the AC system L and a load 21, and a battery 20 is connected via a chopper 19 between the converter 10*a* including the switching element such as an IGBT and the inverter 10.

In a regular operation, AC power Pa from the AC system L is converted to DC power Pd by a rectifier circuit including the filter 12*a* and the converter 10*a*, and the DC power is converted again to AC power by a circuit including the inverter 10 and the filter 12, then the AC power is supplied to the load 21.

In a case where power supply from the AC system L is shut off, the battery 20 and the inverter 10 are connected to each other by the chopper 19, and then power from the battery 20, which is converted to three-phase AC power by the inverter 10 and the filter 12, is kept being supplied to the load 21. Note that, although not shown, a bypass circuit to be used at a time of maintenance or the like is connected between the AC system L and the load 21 in general.

The filter 12 includes the three-phase reactor 13 and the capacitor 14, and the filter 12a includes the three-phase reactor 13a and the capacitor 14a. The filter 12a is connected between the AC system L and the converter 10a, and filter 12 is connected between the inverter 10 and the load 21. The filter 12 mutually performs impedance matching and the filter 12a forms pseudo three-phase AC power generated in the inverter to a sinusoidal three-phase AC waveform.

The three-phase reactors 13, 13a include iron cores having the same shape as those in the example of FIG. 2 and the example of FIG. 3. By using the reactor device, it is possible to achieve a UPS apparatus having excellent conversion efficiency and having excellent symmetry of outputted three-phase AC power.

Figure 6:
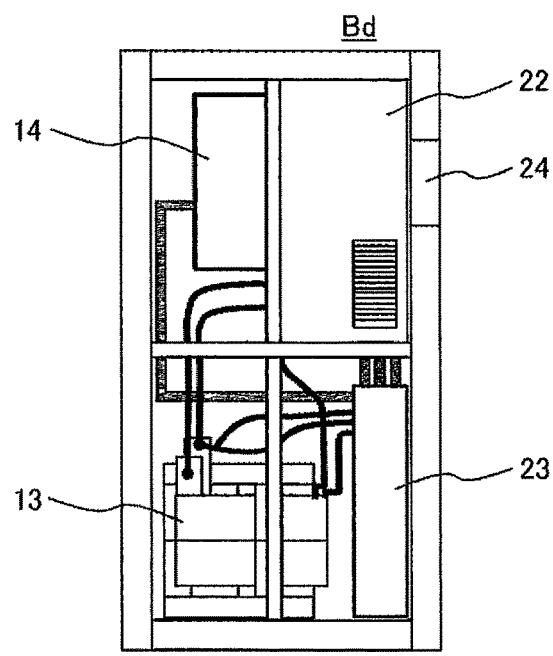
FIG. 6 is a vertical cross-sectional view of an inside of a switchboard including a power conversion apparatus.
Figure 7:
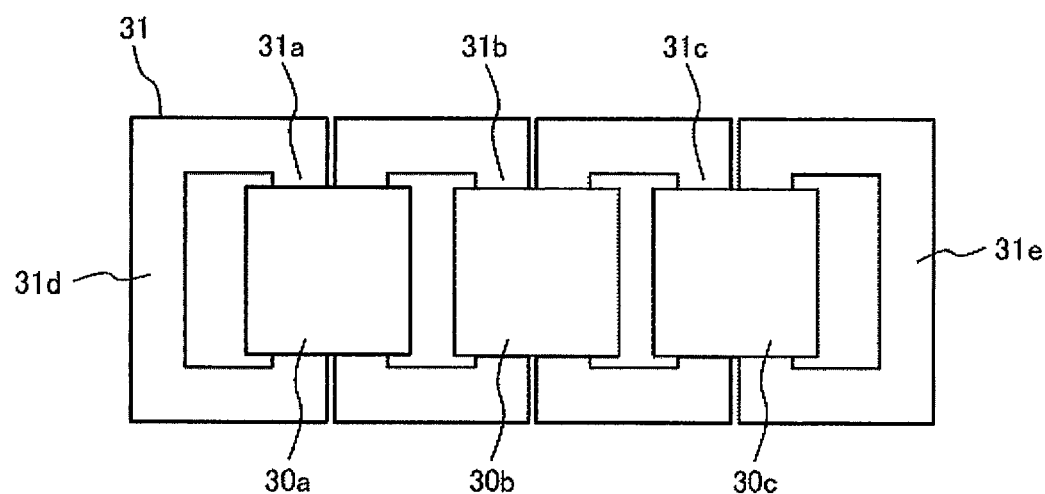
FIG. 7 is a structure of a conventional example of a three-phase five-leg type transformer.

FIG. 6 is a vertical cross-sectional view of an inside of a switchboard including a power conversion apparatus of the invention, in which the power conversion apparatus for solar power generation of FIG. 1 is illustrated as an example.

A switchboard Bd provides: an inverter board 22 in which a boost converter including a switching element such as an IGBT, an inverter, and controlling means for controlling operations of those circuits are provided; the capacitor 14 constituting the filter; the reactor device 13; and an inputting and outputting board 23. In front of the inverter board 22, a cooling fan 24 is provided. The reactor device 13 is horizontally provided and fixed in a lower portion of the switchboard Bd, and is connected to other structures through wires corresponding to a circuit configuration illustrated in FIG. 1.

As FIG. 1 illustrates an entire structure as the perspective view, the reactor device 13 has a columnar shape. Therefore, the reactor device 13 can be housed in the lower portion of the switchboard Bd without increasing an area for providing the reactor device 13. This makes it possible to compactly provide the reactor device 13 in the switchboard Bd.

REFERENCE SIGNS LIST 1a, 1b: yoke iron core, 2: coil, 2a: electrode, 3: magnetic leg iron core, 3a: slit, 4: magnetic leg iron core for zero-phase impedance, 5: gap, 10: inverter, 10a: converter, 11: boost converter, 12, 12a: filter, 13, 13a: reactor, 14, 14a: capacitor, 15: solar cell, 16: generator, 17: gear, 18: windmill, 19: chopper, 20: battery, 21: load, 22: inverter board, 23: inputting and outputting board, 24: cooling fan, 30a, 30b, 30c: coil, 31: two-leg iron core, 31a, 31b, 31c: magnetic leg section, 31d, 31e: magnetic leg section for zero-phase impedance

The invention claimed is:

1. A power conversion apparatus comprising:
an inverter for converting DC power to polyphase AC power with use of a switching element, where the inverter turns on and off the switching element at a timing at which a carrier frequency and a fundamental frequency intersect each other to output a pseudo sine wave alternating current at an AC-terminal side thereof; and
a filter circuit including a reactor provided on the AC-terminal side of the inverter, and which outputs a sine wave alternating current,
wherein the reactor of the filter circuit includes
a vertical pair of yoke cores, in each of which a thin strip of magnetic material is rolled in a toroidal manner,
a plurality of first magnetic leg cores corresponding to respective phases of the polyphase AC power, each of the first magnetic leg cores being a pillar formed of thin-strips of magnetic material, being disposed at a corresponding position on a circumference of the yoke cores, connecting the yoke cores, and having a respective coil wound therearound, and
a plurality of second magnetic leg cores for zero-phase impedance corresponding to the respective phases, each of the second magnetic leg cores for zero-phase impedance having a rectangular parallelepiped shape formed of thin strips of magnetic material laminated in a direction from a center of the yoke cores toward a periphery of the yoke cores, being provided between the first magnetic leg cores on the circumference of the yoke cores, connecting the yoke cores, and having no respective coil wound therearound.

2. The power conversion apparatus according to claim 1, wherein each of the first magnetic leg cores includes a plurality of cores stacked with one or more gaps therebetween, and an insulator is inserted in the gaps.

3. The power conversion apparatus according to claim 1, wherein each of the first magnetic leg cores has a slit in a direction in which the yoke cores are provided.

4. The power conversion apparatus according to claim 1, wherein each of the first magnetic leg scores is a pillar formed by rolling a thin strip of magnetic material in a toroidal manner.

5. The power conversion apparatus according to claim 1, wherein each of the first magnetic leg cores has a fan shape in which a plurality of thin strips of magnetic material are laminated in the direction from the center of the yoke cores toward the periphery of the yoke cores.

6. The power conversion apparatus according to claim 1, wherein one of a winding start portion and a winding end portion of the coil of each of the first magnetic leg cores is connected to a phase on the inverter side of the filter circuit and the other of the winding start portion and the winding end portion is connected to a phase on an output side of the filter circuit.

7. The power conversion apparatus according to claim 1, wherein the power conversion apparatus is connected between a boost converter circuit connected to a solar cell and system wires and converts DC power generated in the solar cell to three-phase AC power having a fixed frequency.

8. The power conversion apparatus according to claim 1, wherein the power conversion apparatus
is provided between a converter circuit and system wires, the converter circuit being connected via a gear to a generator for generating power with use of a windmill and
converts, to three-phase AC power having a fixed frequency, AC power whose frequency continuously changes and which is generated by the generator.

9. An uninterruptible power supply (UPS) apparatus device comprising:
a first power conversion apparatus which converts AC power from system wires to DC power;
a second power conversion apparatus including:
an inverter for converting the DC power to polyphase AC power with use of a switching element, where the inverter turns on and off the switching element at a timing at which a carrier frequency and a fundamental frequency intersect each other to output a pseudo sine wave alternating current at an AC-terminal side thereof; and a filter circuit including a reactor provided on the AC-terminal side of the inverter, and which outputs a sine wave alternating current, wherein the reactor of the filter circuit includes:

a vertical pair of yoke cores, in each of which a thin strip of magnetic material is rolled in a toroidal manner, a plurality of first magnetic leg cores corresponding to respective phases of the polyphase AC power, each of the first magnetic leg cores being a pillar formed of thin-strips of magnetic material, being disposed at a corresponding position on a circumference of the yoke cores, connecting the yoke cores, and having a respective coil wound therearound, and a plurality of second magnetic leg cores for zero-phase impedance corresponding to the respective phases, each of the second magnetic leg cores for zero-phase impedance having a rectangular parallelepiped shape formed of thin strips of magnetic material laminated in a direction from a center of the yoke cores toward a periphery of the yoke cores, being provided between the first magnetic leg cores on the circumference of the yoke cores, connecting the yoke cores, and having no respective coil wound therearound, and wherein respective DC power ports of the first and second power conversion apparatuses are connected with each other, and a battery is connected via a chopper to the DC power ports of the first and second power conversion apparatuses.

\* \* \* \* \*